United States Patent
Maslennikov et al.

(10) Patent No.: US 6,301,706 B1
(45) Date of Patent: Oct. 9, 2001

(54) COMPILER METHOD AND APPARATUS FOR ELIMINATION OF REDUNDANT SPECULATIVE COMPUTATIONS FROM INNERMOST LOOPS

(75) Inventors: Dmitry M. Maslennikov; Vladimir Y. Volkonsky, both of Moscow (RU)

(73) Assignee: Elbrus International Limited (KY)

(*) Notice: Subject to any disclaimer, the term of this patent is extended or adjusted under 35 U.S.C. 154(b) by 0 days.

(21) Appl. No.: 09/220,503

(22) Filed: Dec. 24, 1998

Related U.S. Application Data

(60) Provisional application No. 60/070,177, filed on Dec. 31, 1997.

(51) Int. Cl.[7] ...................................................... G06F 9/45
(52) U.S. Cl. ............................ 717/9; 717/6; 712/24; 712/241
(58) Field of Search .................. 717/9, 6, 4, 5; 712/24, 241, 233–234

(56) References Cited

U.S. PATENT DOCUMENTS

| | | | |
|---|---|---|---|
| 4,710,872 | * 12/1987 | Scarborough | 717/7 |
| 4,821,181 | 4/1989 | Iwasawa | 717/2 |
| 5,202,995 | 4/1993 | O'Brien | 717/9 |
| 5,481,723 | * 1/1996 | Harris et al. | 717/6 |
| 5,584,027 | * 12/1996 | Smith | 717/7 |
| 5,958,048 | * 9/1999 | Babaian et al. | 712/241 |
| 6,026,240 | * 2/2000 | Subramanian | 717/9 |
| 6,049,669 | * 4/2000 | Holler | 717/9 |
| 6,148,439 | * 11/2000 | Nishiyama | 717/9 |

OTHER PUBLICATIONS

Tang et al., "Impact of Self-Scheduling Order on Performance of Multiprocessor Systems," ACM Proceedings on Int'l Conference on Supercomputing, Nov. 14–18, 1988, pp. 593–603.*

Tang et al., "Compiler Techniques for Data Synchronization in Nested Parallel Loops," ACM Proceedings on the 1990 Int'l Conference on Supercomputing, Jun. 11–15, 1990, pp. 177–186.*

Ebcioglu et al., "VLIW Compilation Techniques in a Superscalar Environment," Proceedings of the ACM Sigplan '94 Conf. on Programming Language Design and Implementation, Jun. 1994, pp. 36–48.*

Yu et al., "Control Mechanism for Software Pipelining on Nested Loop," Proceedings of the IEEE on Advances in Parallel and Distributed Computing, Mar. 19–21, 1997. pp. 345–350.*

Muchnick, Steven S., *Advanced Compiler Design and Implementation*, 1997, pp. 588–589.

* cited by examiner

Primary Examiner—Tuan Q. Dam

(57) ABSTRACT

A method and system for use with VLIW processing architectures for avoiding redundant speculative computations in the compilation of the innermost loops. The method includes identifying a plurality of compiled flow paths, where each of the paths includes a plurality of conditions associated with the loop that permits transformation of the loop for more optimum execution. It is then determined whether the loop has an inductive variable and a conditional statement that depends on the inductive variable. It is also determined whether the loop set up values of the inductive variables to subsets, and at least one of which the conditional statement is a loop invariant. Finally, if conditions in the determination steps satisfy the conditions of one of the paths, the loop is transformed into two consecutive loops executable with a reduced set of values of the inductive variable.

6 Claims, 1 Drawing Sheet

Figure 1:
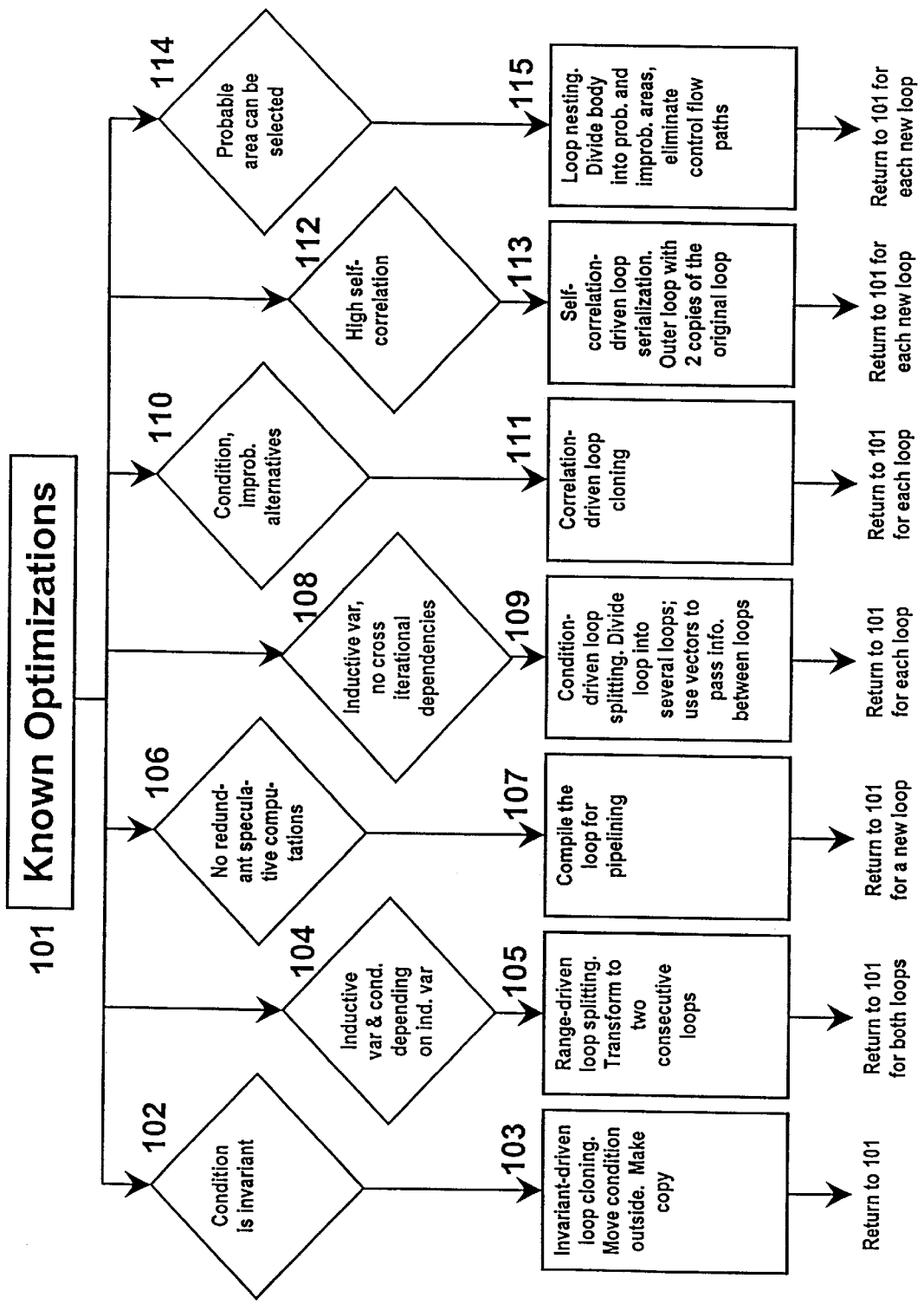

COMPILER METHOD AND APPARATUS FOR ELIMINATION OF REDUNDANT SPECULATIVE COMPUTATIONS FROM INNERMOST LOOPS

This application claims benefit of provisional application ser. no. 60/070,177, filed Dec. 31, 1997.

I. FIELD OF THE INVENTION

The present invention relates to processors and computing devices and more particularly to compiler techniques for optimizing loop constructs.

II. BACKGROUND OF THE INVENTION

Many practical applications require processing of very large amounts of information in a short period of time. One of the basic approaches to minimizing the time to perform such computations is to apply some sort of parallelism, so that tasks which are logically independent can be performed in parallel. This can be done, for example, by executing two or more instructions per machine cycle, i.e., by means of instruction-level parallelism. Thus, in a class of computers using superscalar processing, hardware is used to detect independent instructions and execute them in parallel, often using techniques developed in the early supercomputers.

Another approach to exploiting instruction level parallelism is used by the Very Long Instruction Word (VLIW) processor architectures in which the compiler performs most instruction scheduling and parallel dispatching at compile time, reducing the operating burden at run time. By moving the scheduling tasks to the compiler, a VLIW processor avoids both the operating latency problems and the large and complex circuitry associated with on-chip instruction scheduling logic. Both superscalar and VLIW processors take advantage of techniques know as pipelining for instruction scheduling optimization.

As known, each VLIW instruction includes multiple independent operations for execution by the processor in a single cycle. A VLIW compiler processes these instructions according to precise conformance to the structure of the processor, including the number and type of the execution units, as well as execution unit timing and latencies. The compiler groups the operations into a wide instruction for execution in one cycle. At run time, the wide instruction is applied to the various execution units with little decoding. The execution units in a VLIW processor typically include arithmetic units such as floating point arithmetic units. An example of a VLIW processor that includes floating point execution units is described by R. K. Montoye, et. al. in "Design of the IBM RISC System/6000 floating point execution unit", IBM J.Res. Develop., V. 43 No.1, pp. 61–62, January 1990.Additional examples are provided in U.S. Pat. No. 5,418,975, which is incorporated herein by reference in the entirety.

Predicated and speculative computations are known in the art, see e.g. *Parallel and Distributed Computing Handbook*, Albert Y. Zomaya, Editor, McGraw-Hill 1996, chapter 21, Superscalar and VLIW Processors, pp 621–647, incorporated herein by reference. To improve efficiency, certain instructions may be executed speculatively and their results may then be retired or discarded. Also it is known that profile data that characterizes program behavior can be obtained by performing test runs of the program. Such a technique is employed, for example, for profiled branch prediction. This generated profile data enables the compiler to identify probable alternatives of a conditional statement so as to enhance the efficiency of speculative computations.

While these processors are capable of performing a variety of tasks adequately, it is perceived that the performance of VLIW processors can be improved further by improving optimization techniques employed by compilers that compile programs for VLIW processing. More specifically, redundant speculative computations in the loop body may reduce effectiveness of loop software pipelining. Thus, it desirable to provide for program compilation that reduces such redundant speculative calculations in the innermost loops.

III. SUMMARY OF THE INVENTION

A novel method and system is presented for use with VLIW and other parallel processing architectures for avoiding redundant speculative computations in the compilation of the innermost loops.

The method includes: a) determining whether the loop has an inductive variable (such as a counter or a loop iteration variable) and a conditional statement, which depends on the inductive variable; b) determining if a set of values of the inductive variable includes two subsets, in at least one of which the conditional statement is a loop invariant; and c) if conditions in steps a) and b) are satisfied, transforming the loop into two consecutive loops executable with a reduced set of values of the inductive variable.

The method also includes: a) determining if the loop has an inductive variable and does not have cross-iterational data dependencies; b) if the conditions in a) are satisfied, dividing the loop at a conditional statement, which brings redundant speculative calculations into the loop, so as to form at least a first and a second consecutive loops; and c) providing intermediate vectors so as to enable communication between the first and the second newly formed loops, wherein one vector is provided for each data dependence between the new loops.

The method also includes: a) determining if the loop has a conditional statement, which has improbable alternatives on certain control flow paths leading to the loop; and b) if the condition in a) is satisfied, creating a copy of the loop that contains the improbable alternatives.

The method also includes: a) determining if the loop has a conditional statement, which has no improbable alternatives, but the result of the condition remains the same in successive loop iterations with high probability; and b) if this condition in the previous step is satisfied, forming an outer loop, which contains two copies of the original loop, wherein in each of the copies the conditional statement is transformed such that the improbable result of the statement leads to exit from a given loop copy and transfer to another loop copy.

The method also includes: a) dividing the loop into a probable area and an improbable area; b) duplicating parts of the probable area so that all control flow paths from the improbable area to the probable area are eliminated; and c) forming a new outer loop such that all the back edges of the loop that originated in the improbable area are moved from a head of the original loop to the head of the new outer loop.

In general, the disclosed method includes: a) identifying if there is a condition within the loop that permits modification of the loop for optimization so as at least to reduce redundant speculative calculations; b) if the condition in step (a) has been identified, transforming the loop into one or more new modified loops, otherwise optimizing a program within the loop and returning to step (a) with another loop; and (c) repeating steps (a) and (b) for each of the new modified loops obtained by the transformation in step (b).

IV. BRIEF DESCRIPTION OF THE DRAWINGS

FIG. 1 illustrates a high level flow chart of the preferred embodiment.

V. DETAILED DESCRIPTION OF THE PREFERRED EMBODIMENT

As noted redundant speculative computations in the body of an inner-most loop may reduce effectiveness of loop software pipelining. To avoid this effect, the compiler processes each innermost loop of a program being compiled according to the procedure described below.

First, for a given loop, the compiler performs known flow optimizations, including constant propagation, dead code elimination, invariant removal as well as other optimizations as known in the art. This operation is shown as 101 in FIG. 1. If the examined loop has a conditional statement, which is an invariant of this loop (See 102 of FIG. 1), the compiler moves this statement outside of the loop and makes a copy of the loop, which will be executed instead of the original loop if and only if the result of the invariant condition is equal to true. (See 103, FIG. 1). The transformation in 103 is referred to herein as invariant-driven loop cloning. Such transformations are known in the art and sometimes referred to as loop unswitching, see Bacon et al., *Compiler Transformations for High-Performance Computing,* ACM Computing Surveys, v26, n4, (December 1994), incorporated herein by reference. Thereafter, the compiler returns to 101 for the original loop and the copy of the loop.

If the examined loop has an inductive variable (such as a counter or loop iteration variable) and a conditional statement, which depends on this inductive variable and, in addition, if the entire set of values of the inductive variable can be divided into two subsets so that in at least one of them this conditional statement is a loop invariant (see 104, FIG. 1), then the compiler transforms the original loop into two consecutive loops. The newly formed loops will be executed with a reduced set of values of the inductive variable. See generally 105, FIG. 1. As noted, the inductive variable, in general, can be a counter or a loop iteration variable, such as "i" in "for (i=0;i<N;i++)". Thereafter, the processing of the compiler returns to 101, FIG. 1 for both resulting loops.

The transformation 105 is referred to herein as range-driven loop splitting. The following Example 1 illustrates the range-driven loop splitting 105.

EXAMPLE 1
Before transformation:

```
for(i = 0; i < N; i++)
{
        if (i < K) /* K is a loop invariant */
        {
                then_alternative;
        }
        else
        {
                else_alternative;
        }
}
```

In this example, the entire set of values of the inductive variable "i" can be divided into two subsets: [0, K) and [K, N). (In the C language notation (i>=0 && i<K) and (i>=K && i<N)).

After transformation:

```
for(i = 0; i < K; i++)
{
        if (i < K) /* this condition is equal to TRUE */
        {
                then_alternative;
        }
        else
        {
                else_alternative;
        }
}
for(; i < N; i++)
{
        if (i < K) /* this condition is equal to FALSE */
        {
                then_alternative;
        }
        else
        {
                else_alternative;
        }
}
```

After known transformations (such as unreachable code removing) the following resulting loops are obtained:

```
for(i = 0; i < K; i++)
{
        then_alternative;
}
for(; i < N; i++)
{
        else_alternative;
}
```

If the examined loop has no redundant speculative computations (see 106, FIG. 1), the loop is compiled for software pipelining, see 107, FIG. 1. Then, the next innermost loop is considered starting with step 101, FIG. 1.

If the examined loop has an inductive variable and does not have cross-iterational data dependencies (except for incrementing for decrementing the inductive variable), the compiler divides the examined loop into two or three consecutive loops. The loop is divided at the conditional statement, which brings redundant speculative calculations into the loop body. See 108 and 109, FIG. 1. The transformation 109 is referred to herein as condition-driven loop splitting.

The first of the newly formed loops in 109 performs computations in the portion of the body of the original loop, which precedes the conditional statement, and also computes the value of this conditional statement. The second loop and the third one, if necessary, perform computations for one of the alternatives of the conditional statement as well as the remaining computations in the body of original loop.

To pass information from the first newly formed loop to the second and possibly third newly formed loops, intermediate vectors are introduced in the first loop. Namely one vector is provided for each data dependence between the new loops. Each vector length depends on the number of times the condition was satisfied. If the maximum possible value of the inductive variable in the original loop is not computed, an additional outer loop is formed so as to prevent violations of the bounds of the intermediate vectors. This technique is employed when it is not determined how much memory should be allocated for a vector.

Thereafter, execution of the compiler returns to step 101 for all the newly formed loops.

The basic principles discussed above in connection with 108 and 109 are illustrated in the examples of condition-driven loop splitting below (Examples 2, 3, and 4).

EXAMPLE 2
Before transformation

```
for (i=0;i<N;i++)
{
    A[i] = B[i] + 1;
    if (q)
        C[i] = D[i] * B[i] + E[i] * F[i] + A[i];
}
```

After transformation:

```
M = 0;
for (i=0;i<N;i++)
{
    A[i] = B[i] + 1;
    if (q)
        VEC [m++] = i;
}
for (j=0;j<M;j++)
{
    ii = VEC1[j];
    C[ii] = D[ii] * B[ii] + E[ii] * F[ii] + A[ii];
}
```

Another illustration of this condition-driven loop splitting transformation is provided in the following Example 3:

EXAMPLE 3
Before transformation:

```
for (i = 0; i < N; i++)
{
    q = A[i] + B[i];
    if (q > 0)
    {
        C[i] = D[i] * B[i] + q * i;
    }
    else
    {
        C[i] = E[i] * F[i] + G[i] * i;
    }
}
```

When this loop is divided at the condition "q>0", there exist two data dependencies between the first resultant loop and the second resultant loop ("q" and "i") and there is one data dependence between the first resultant loop and the third resultant loop ("i").

After transformation:

```
/* First resultant loop */
count_then = count_else = 0;
for (i = 0; i < N; i++)
{
    q = A[i] + B[i];
    if (q > 0)
    {
        VEC_i_then[count_then++] = i;
        VEC_q[count_then++] = q;
    }
    else
    {
        VEC_i_else[count_else++] = i;
    }
}
/* Second resultant loop */
for (j = 0; j < count_then; j++)
{
    ii = VEC_i_then[j];
    qq = VEC_q[j];
    C[ii] = D[ii] * B[ii] + qq * ii;
}
/* Third resultant loop */
for (j = 0; j < count_else; j++)
{
    ii = VEC_i_else[j];
    C[ii] = E[ii] * F[ii] + G[ii] * i;
}
```

It should be noted that the loop iteration counter ("i" in this example) is simply one of data dependencies between the resultant loops.

Another example (Example 4 below) of condition-driven loop splitting demonstrated a general case of the use of this technique.

EXAMPLE 4
Before transformation:

```
for (i = 0; i < N; i++)
{
    q = A[i] + B[i];
    if (q > 0)
    {
        C[i] = D[i] * B[i] + q * i;
    }
    else
    {
        C[i] = E[i] * F[i] + G[i] * i;
    }
}
```

This source program is similar to the source in the previous example of the condition-driven loop splitting transformation. In this example, however, let us assume that the compiler cannot compute the maximum possible value of N. In this case, the compiler does not know the size of the intermediate vectors and, therefore, it cannot statically allocate memory for these vectors. Moreover, in some cases the compiler knows the maximal possible value of N, but this value is too large to statically allocate an intermediate vector of such a size. In these cases, an outer loop is formed. More specifically, in the cases where the size of an intermediate vector is unknown or too large for static allocation, two consecutive transformations are performed. First, the compiler performs a known transformation, which is generally referred to as loop tiling or loop blocking (see e.g. Bacon et al., *Compiler transformations for High-Performance Computing*, ACM Computing Surveys, v26, n4, December 1994). This transformation of the above program is shown below.

After loop blocking:

```
for(I=0; I < N; I += 1024)
{
    N_min = min(I+1024,N);
    for (i = I; i < N_min; i++)
    {
        q = A[i] + B[i];
        if (q > 0)
        {
            C[i] = D[i] * B[i] + q * i;
        }
        else
        {
            C[i] = E[i] * F[i] + G[i] * i;
        }
    }
}
```

After the loop blocking, the innermost loop has a known maximum repetition number. This number is chosen by the compiler (it is 1024 in this example). The compiler "knows" that it is possible to statically allocate intermediate vectors of this size.

As illustrated below, condition-based loop splitting is then applied to the transformed loop.

After transformation:

```
/* Statically allocated intermediate vectors */
int VEC_i_then[1024];
(type of q) VEC_q[1024];
int VEC_i_else[1024];
for(I=0; I < N; I += 1024) /* outer loop */
{
    N_min = min(I+1024,N);
    /* First resulting loop */
    count_then = count_else = 0;
    for (i = I; i < N_min; i++)
    {
        q = A[i] + B[i];
        if (q > 0)
        {
            VEC_i_then[count_then++] = i;
            VEC_q[count_then++] = q;
        }
        else
        {
            VEC_i_else[count_else++] = i;
        }
    }
    /* Second resultant loop */
    for (j = 0; j < count_then; j++)
    {
        ii = VEC_i_then[j];
        qq = VEC_q[j];
        C[ii] = D[ii] * B[ii] + qq * ii;
    }
    /* Third resultant loop */
    for (j = 0; j < count_else; j++)
    {
        ii = VEC_i_else[j];
        C[ii] = E[ii] * F[ii] + G[ii] * i;
    }
}
```

If the examined loop has a conditional statement and, in general, no improbable alternatives can be identified, but such improbable alternatives exist on certain paths reaching the loop (i.e. if there is a correlation between the behavior of this conditional statement and the control flow paths reaching the examined loop), the operation of the compiler is as follows. (See FIG. 1, blocks 110 and 111). The compiler performs loop cloning for the examined loop such that at least in one of the newly formed loops the conditional statement has improbable alternative. Thereafter, the execution of the compiler returns to step 101 for both newly formed loops. The transformation 111 is referred to herein as correlation-driven loop cloning.

The following example (Example 5) illustrates the correlation-driven loop cloning. This example assists in understanding of loop cloning when there is a correlation in behavior of an in-loop condition and a control flow path leading to the loop.

EXAMPLE 5

Before transformation:

```
if (condition1)
    then_expression1;
else
    else_expression1;
while(loop_condition)
{
/*
* There is a correlation in behavior of condition1
* and condition2.
*/
    if (condition2)
        then_expression2;
    else
        else_expression2;
}
```

After transformation:

```
if (condition1)
{
    then_expression1;
    while(loop_condition)
    {
        if (condition2)
            then_expression2; /* improbable computations in this
                                 loop copy */
        else
            else_expression2;
    }
}
else
{
    else_expression1;
    while(loop_condition)
    {
        if (condition2)
            then_expression2;
        else
            else_expression2; /* improbable computations in this
                                 loop copy */
    }
}
```

This transformation (as well as self-correlation based transformation described herein) does not eliminate computations from bodies of the resultant loops. However, after these transformations, both resultant loops become good candidates for other transformations described here, such as loop nesting, for example.

If the examined loop has a conditional statement, which has no improbable alternatives, but has a high "self-correlation" (i.e. if the result of the condition remains the same in successive loop iterations with high probability—this information can be collected by a profiler, as known in the art), then the compiler performs the following transformation: instead of the original loop, the compiler forms an outer loop, which contains two copies of the original loop.

See 112 and 113, FIG. 1; the transformation 113 is referred to herein as self-correlation-driven loop serialization.

In each copy of the original loop the conditional statement is transformed such that the improbable result of this statement (i.e. true for one loop copy and false for another one) will lead to exit from the current loop copy and transfer to another loop copy. After performing this transformation the compiler returns to step 101 for both newly formed innermost loops. This transformation is illustrated in the following Example 6.

EXAMPLE 6

Before transformation:

```
while (q1)
{
    if (q2)
        expr1 ();
    else
        expr2 ();
}
```

After transformation:

```
while (TRUE)
{
    while (q1)
    {
        if (q2)
            expr1 ();
        else
            goto L1;
    }
    break;
L1: expr2 ();
    while (q1)
    {
        if (q2)
            goto L2;
        else
            expr2 ();
    }
    break;
L2: expr1 ();
}
```

If a "probable area" can be selected in the body of the examined loop (see 114, FIG. 1), then the compiler transforms the original loop into nested loops in the following manner (see 115):

The body of the examined loop is divided into the probable area and the improbable area;

all control flow paths from the improbable area to the probable area (except for the cross-iterational paths) are eliminated due to the duplication of the parts of the probable area;

a new outer loop is formed such that all the back edges of the originate loop that originate in the improbable area are moved from the head of original loop to the head of the new outer loop. As a result, the new outer loop contains the inner loop, which body has only probable computations of the loop. After performing loop nesting the compiler returns to step 101 for the newly formed inner loop.

This transformation in 115 is referred to as loop nesting. The loop nesting transformation 115 is illustrated in the Example 7 below.

EXAMPLE 7

Before transformations:

```
while (q1)
{
    a++;
    if (q2)
    {
        . . .
        /* various computations */
    }
}
```

After transformations:

```
while (TRUE)
{
    while (q1)
    {
        a++;
        if (q2)
            goto L;
    }
    break;
L: . . .
    /* The same computations */
}
```

The processing of the compiler for optimizing inner loops, employing the methods discussed above, is illustrated in the following example.

```
innermost_loop_list = NULL;
for each innermost loop L in procedure
{
    insert L into innermost_loop_list;
}
while((L = next_unit(innermost_loop_list)) != NULL)
{
    apply_known_flow_optimizations(L);
    if (attempt_to_apply_invariant_driven_loop_cloning(L))
    {
        append both resulting loops to the end of
innermost_loop_list;
        continue;
    }
    if (attempt_to_apply_range_driven_loop_splitting(L))
    {
        append both resulting loops to the end of
innermost_loop_list;
        continue;
    }
    if (!loop_has_redundant_speculative_calculations(L))
    {
        enable_software_pipelining(L);
        continue;
    }
    if (attempt_to_apply_condition_driven_loop_splitting(L))
    {
        append 2 or 3 resulting loops to the end of
innermost_loop_list;
        continue;
    }
    if (attempt_to_apply_correlation_driven_loop_cloning(L))
    {
        append both resulting loops to the end of
innermost_loop_list;
        continue;
    }
    if (attempt_to_apply_self_correlation_driven_loop_
serialization(L))
    {
```

```
        append both resulting innermost loops to the end of
    innermost_loop_list;
            continue;
        }
        if (attempt_to_apply_loop_nesting(L))
        {
            append resulting innermost loop to the end of
    innermost_loop_list;
            continue;
        }
    }
```

We claim:

1. A computer method of compiling an innermost loop for very long instruction word (VLIW) processing comprising:
   a) identifying a plurality of compile flow paths, wherein each of the paths comprises a plurality of conditions associated with the loop that permits transformation of the loop for more optimum execution;
   b) determining whether the loop has an inductive variable and a conditional statement, which depends on the inductive variable;
   c) determining if a set of values of the inductive variable includes two subsets, in at least one of which the conditional statement is a loop invariant; and
   d) if conditions in steps (b) and (c) satisfy the conditions of one of the paths, transforming the loop into two consecutive loops executable with a reduced set of values of the inductive variable.

2. A computer method of compiling an innermost loop for VLIW processing comprising:
   a) identifying a plurality of compile flow paths, wherein each of the paths comprises a plurality of conditions associated with the loop that permits transformation of the loop for more optimum execution;
   b) determining if the loop has an inductive variable and does not have cross-iterational data dependencies;
   c) if conditions in step (b) satisfy the conditions of one of the paths, dividing the loop at a conditional statement, which brings redundant speculative calculations into the loop, so as to form at least a first and a second consecutive loops; and
   d) providing intermediate vectors so as to enable communication between the first and the second newly formed loops, wherein one vector is provided for each data dependence between the first and the second loops.

3. A computer method of compiling an innermost loop for VLIW processing comprising:
   a) identifying a plurality of compile flow paths, wherein each of the paths comprises a plurality of conditions associated with the loop that permits transformation of the loop for more optimum execution;
   b) determining if the loop has a conditional statement, which has improbable alternatives on certain control flow paths leading to the loop; and
   c) if the condition in step (b) satisfies the conditions of one of the compile flow paths, creating a copy of the loop having the improbable alternatives.

4. A computer method of compiling an innermost loop for VLIW processing comprising:
   a) identifying a plurality of compile flow paths, wherein each of the paths comprises a plurality of conditions associated with the loop that permits transformation of the loop for more optimum execution;
   b) determining if the loop has a conditional statement, which has no improbable alternatives, but the result of the condition remains the same in successive loop iterations with high probability; and
   c) if the condition in the previous step satisfies the conditions of one of the paths, forming an outer loop, which contains two copies of the loop, wherein each of the copies the conditional statement is transformed such that the improbable result of the statement leads to exit from a given loop copy and transfer to another loop copy.

5. A computer method of compiling an innermost loop for VLIW processing comprising:
   a) identifying a plurality of compile flow paths, wherein each of the paths comprises a plurality of conditions associated with the loop that permits transformation of the loop for more optimum execution;
   b) determining whether the loop has a probable area can be selected;
   c) dividing the loop into a probable area and an improbable area;
   d) duplicating parts of the probable area so that all control flow paths from the improbable area to the probable area are eliminated; and
   e) forming a new outer loop such that all the back edges of the loop that originated in the improbable area are moved from a head of the loop to the head of the new outer loop.

6. A computer method of compiling an innermost loop for VLIW processing comprising:
   a) identifying a plurality of compile flow paths, wherein each of the paths comprises a plurality of conditions associated with the loop that permits transformation of the loop for more optimum execution;
   b) identifying if there is a condition within the loop that satisfies one or more conditions within one of the paths;
   c) if the condition in step (b) has been identified, transforming the loop into one or more new modified loops based on the conditions within the satisfied path, otherwise optimizing a program within the loop and returning to step (b) with another innermost loop; and
   d) repeating steps (b) and (c) for each new modified loops obtained by the transformation in step (c).

* * * * *